April 22, 1969  K. B. STROMQVIST  3,439,665
APPARATUS FOR HEATING FOOD
Original Filed Feb. 21, 1964  Sheet 1 of 6

INVENTOR.
Karl Börje Stromqvist
BY
his ATTORNEY

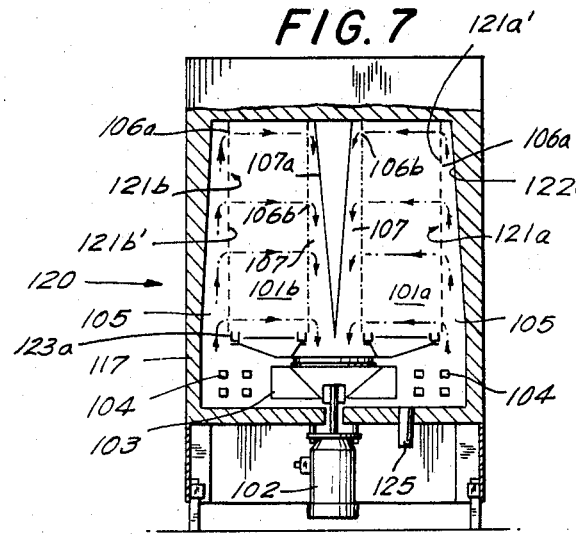
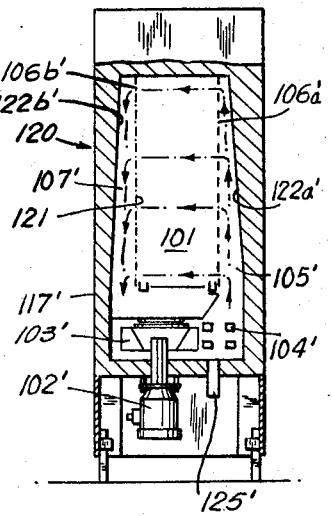
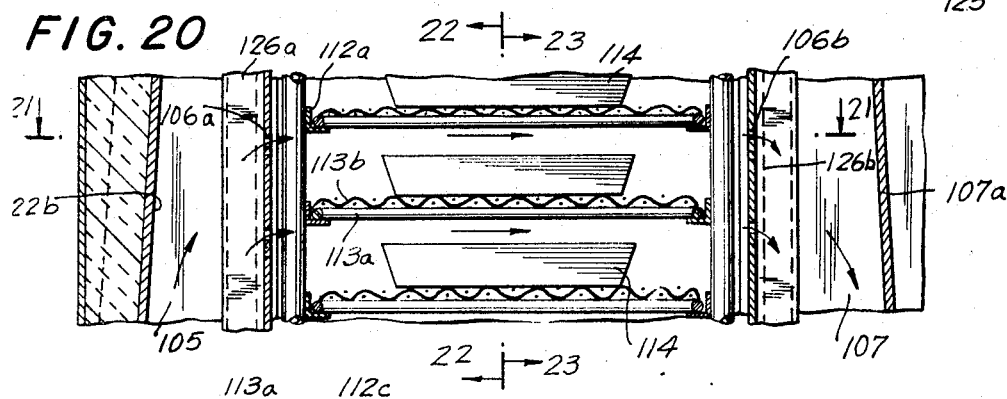
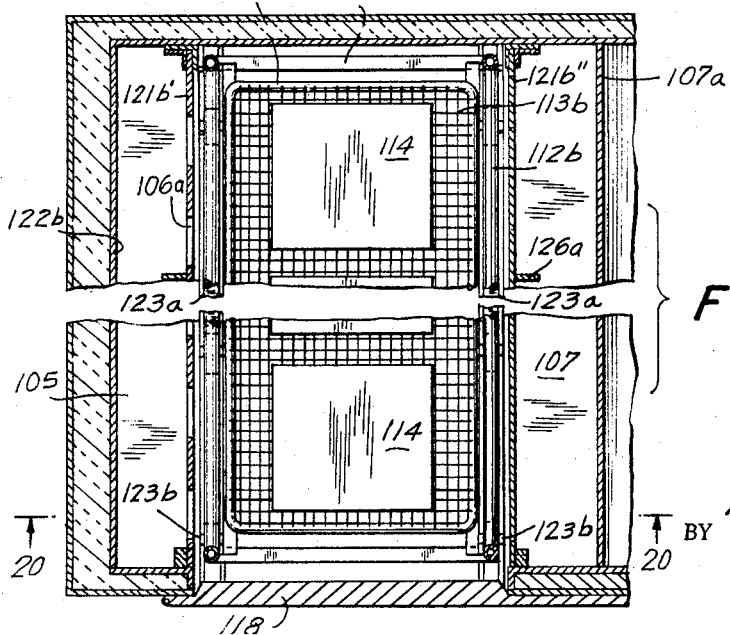

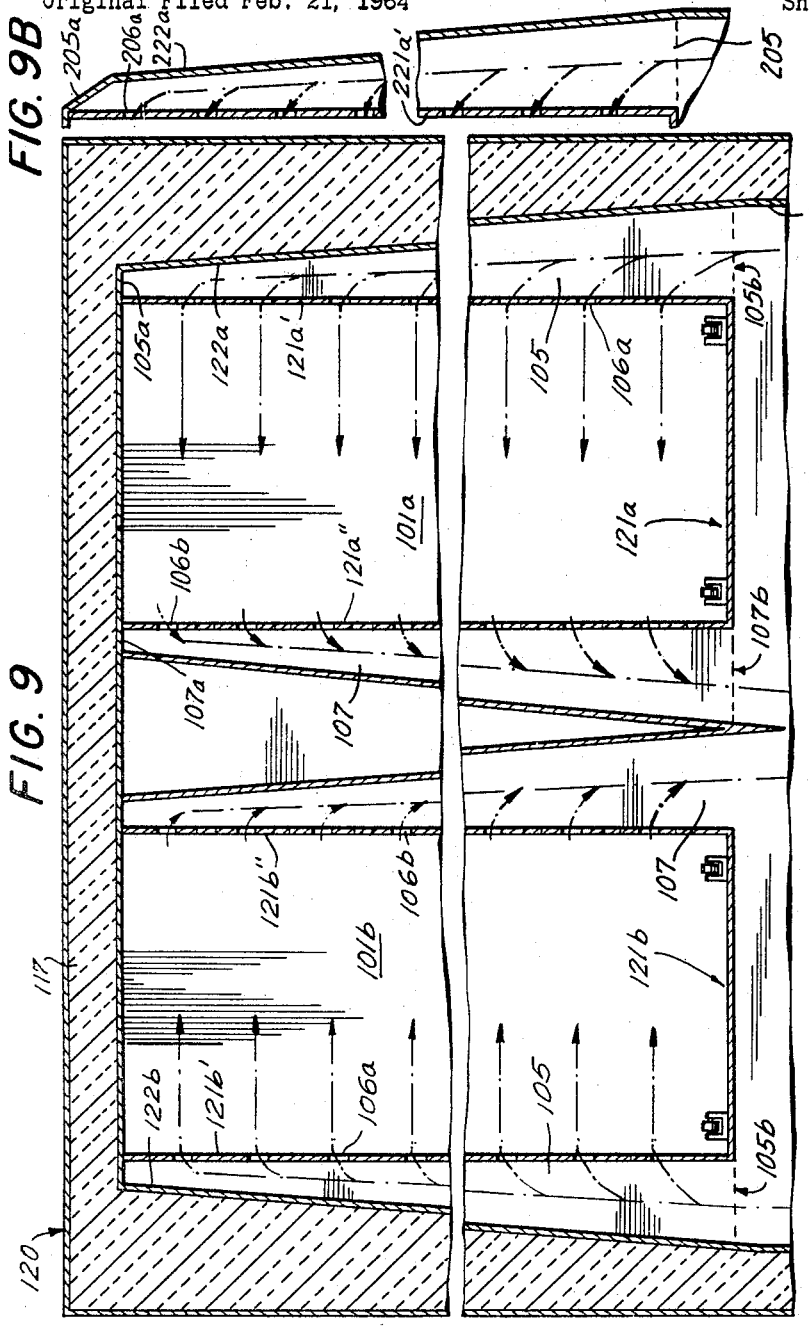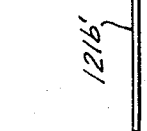

April 22, 1969     K. B. STROMQVIST     3,439,665
APPARATUS FOR HEATING FOOD
Original Filed Feb. 21, 1964
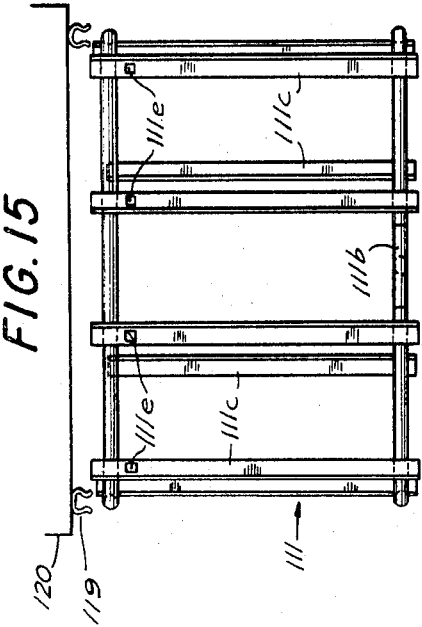
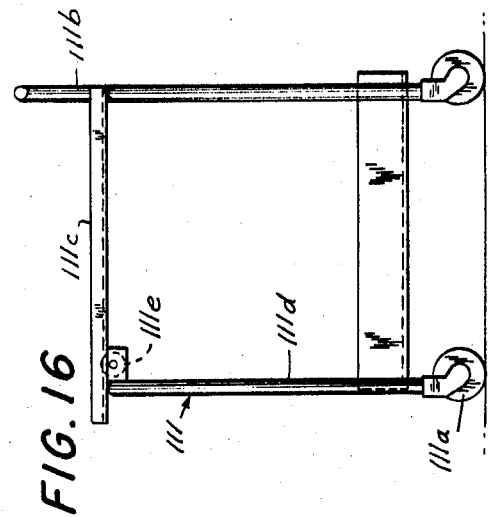
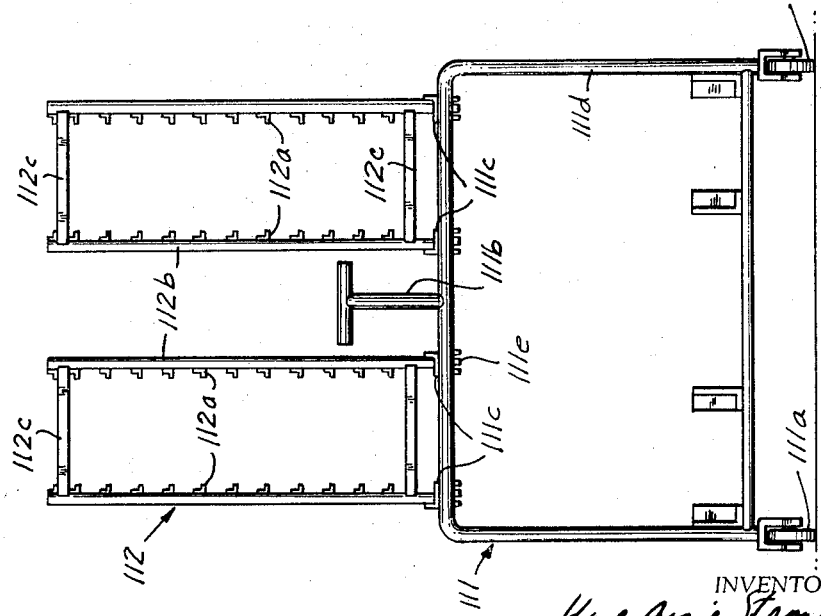
INVENTOR.

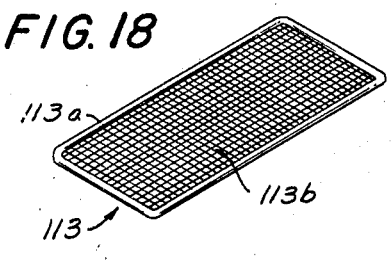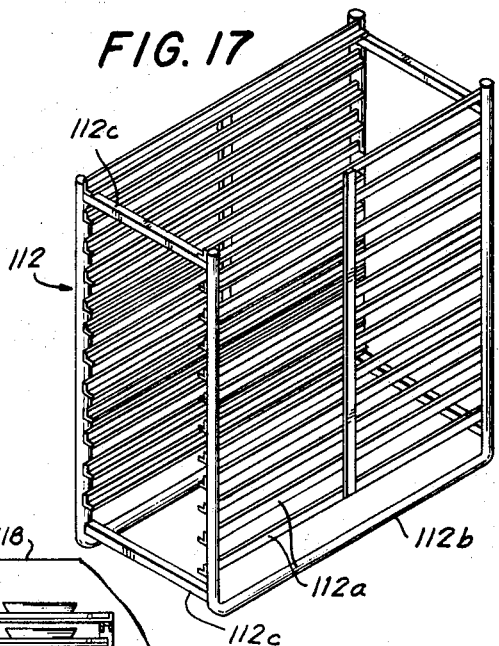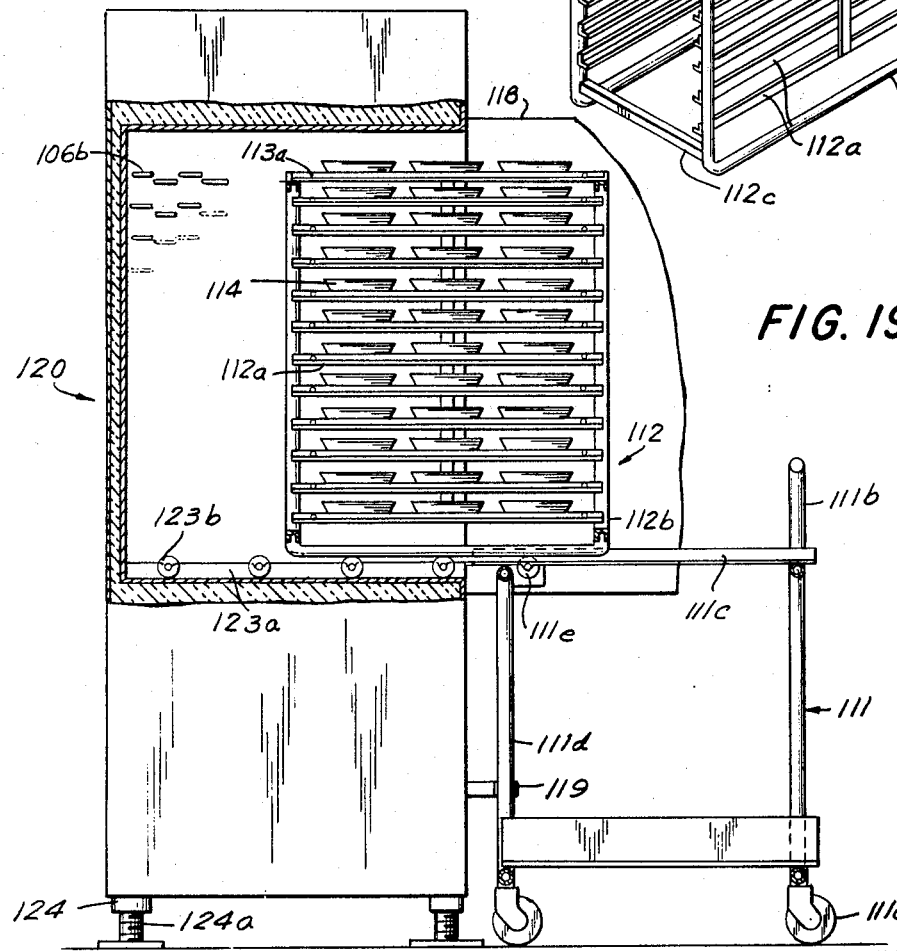

3,439,665
APPARATUS FOR HEATING FOOD
Karl Borje Stromqvist, Bandhagen, Sweden, assignor to Aktiebolaget Electrolux, Stockholm, Sweden, a corporation of the Kingdom of Sweden
Continuation of application Ser. No. 346,549, Feb. 21, 1964, which is a continuation-in-part of application Ser. No. 198,001, May 28, 1962. This application Sept. 30, 1966, Ser. No. 583,481
Int. Cl. F24c *15/32;* A21b *1/26;* A23l *1/00*
U.S. Cl. 126—21                    3 Claims

ABSTRACT OF THE DISCLOSURE

Stacking a plurality of frozen food receptacles in a single body of air in a heating space having opposing air inlet and air outlet sides, the opposing inlet and outlet sides of the space being defined by vertically spaced slots which are formed in horizontally extending rows vertically spaced from one another and opposite one another.

---

This application is a continuation of application Ser. No. 346,549, filed Feb. 21, 1964, now abandoned. Application Ser. No. 346,549 is a continuation in part of application Ser. No. 198,001, filed May 28, 1962, now abandoned.

This invention relates to apparatus for heating food and is especially concerned with rapidly heating to a definite elevated temperature a plurality of receptacles containing food, such as frozen food packages, for example, which are openly stacked one above another in vertically spaced relation in an upright heating space.

In schools, factories, industrial fairs and certain types of restaurants, for example, it is becoming more and more usual to serve precooked food which is heated in individual containers or dishes. Sometimes the food is deep-frozen which requires both thawing and heating in the container before it is served.

One difficulty in providing food service of this kind is obtained approximately the same final temperature in all of the containers when a large number are heated at one time. Heretofore, the best solution has been to heat the containers in a warming oven which is kept at about the final temperature to which the food is to be heated. The disadvantage of this method is that the heating time is very long, because the desired temperature is reached only asymptotically. The time required for heating may be several hours, which often means that the method cannot, on the whole, be fitted into the necessary routine in a kitchen from which a large number of meals must be served in a relatively short time, as in a school, factory, or restaurant serving food to office workers, for example.

It has been found that frozen food packages can be thawed and heated in as short a time as twenty minutes, for example, without adversely affecting the food when the rate at which heat is supplied to the containers is suitably increased. Heating may be effected by air convection at a temperature considerably higher than the desired final temperature of the food or by radiation or by both air convection and radiation. With these heating methods it is important to discontinue heating at the right moment so that the food will not become too hot, and it is obvious that all of the containers must be evenly heated throughout the entire heating period if they are to be at the same temperature when the heating is terminated.

It is an object of this invention to provide an improved apparatus for rapidly heating to a definite elevated temperature at the same time like portions of food held in a plurality of receptacles of the same size, such as frozen food, for example, which are openly stacked one above another in vertically spaced relation in a single body of air in an upright or vertically extending heating space. This is accomplished by forming a single continuously moving mass of heated air in the heating space which defines a single body of air therein and envelops all sides of the receptacles, successive portions of which pass only once from an air inlet side of the space to an opposite air outlet side thereof for discharge from the space. The single continuously moving mass of heated air is formed by dividing the heated air into a plurality of air streams at the air inlet side and forcibly flowing the heated air to the heating space at a sufficiently high velocity for all of the air streams to flow contiguous to and in intimate physical contact with one another and horizontally one above another from the air inlet side of the heating space, and by discharging the streams from the heating space exteriorly thereof at the air outlet side of the space. Further, the divided air streams are formed by distributing the heated air at the air inlet side in such manner that each distributed part of the heated air is introduced into the heating space at the air inlet side at an inlet pressure to cause all of the air streams to flow at the same speed across the heating space from the air inlet side to the opposite air outlet side thereof.

More particularly, the invention is characterized by the provision of air delivery and discharge channels exteriorly of the heating space which form parts of an air circuit in which circulation of air past a heating element is effected with the aid of a fan. The heated air flows to the air delivery channels which function to distribute the air in such manner that the air is deflected and divided into a plurality of streams which pass in substantially parallel paths of flow through the heating space. The heated air is discharged from the heating space and returns to the fan inlet through the air discharge channels which function to collect the discharged air. The manner in which the heated air flows through the heating space is such that a given volume of heated air of each stream will enter and be discharged from the heating space and flow only past those food receptacles disposed in its particular horizontal path of flow.

Further objects and advantages of the invention will become apparent as the following description proceeds, and the various features of novelty which characterize the invention are pointed out with particularity in the claims annexed to and forming a part of this specification.

For a better understanding of the invention, reference may be had to the following description taken in connection with the accompanying drawing, in which:

FIGS. 7 and 8 are views of heating ovens diagrammatically illustrating modifications of the invention;

FIG. 9 is a fragmentary vertical sectional view of the heating oven shown in FIG. 7;

FIGS. 9A and 9B are fragmentary vertical sectional views of details of a heating oven like that shown in FIG. 9 which illustrate a modification of the invention;

FIGS. 12 and 13 are top views of the side walls of the heating spaces shown in FIGS. 10 and 11;

FIG. 14 is a front elevational view illustrating food handling structure for transferring food into and out of the oven shown in FIG. 7;

FIG. 15 is a top plan view of the food handling structure shown in FIG. 14 with the food frames removed therefrom and the front of the heating oven shown in FIG. 7;

FIG. 16 is an end view of the food handling structure shown in FIG. 15;

FIG. 17 is a perspective view of the food frame shown in FIG. 14;

FIG. 18 is a perspective view of an apertured shelf for the food frames shown in FIGS. 14 and 17;

FIG. 19 is an end view of the heating oven shown in FIG. 7 and the food handling structure shown in FIGS. 14, 17 and 18 with the food handling structure adjacent to the heating oven;

FIG. 20 is a fragmentary vertical sectional view of the heating oven shown in FIG. 7, taken at line 20—20 of FIG. 21, illustrating the food frame and shelf of FIGS. 17 and 18 in the heating oven shown in FIG. 7;

FIG. 21 is a horizontal sectional view taken at line 21—21 of FIG. 20; and

Figure 22:
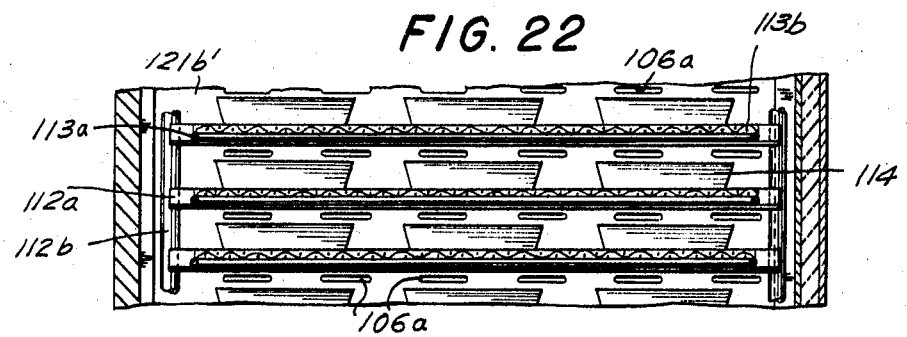
Figure 23:
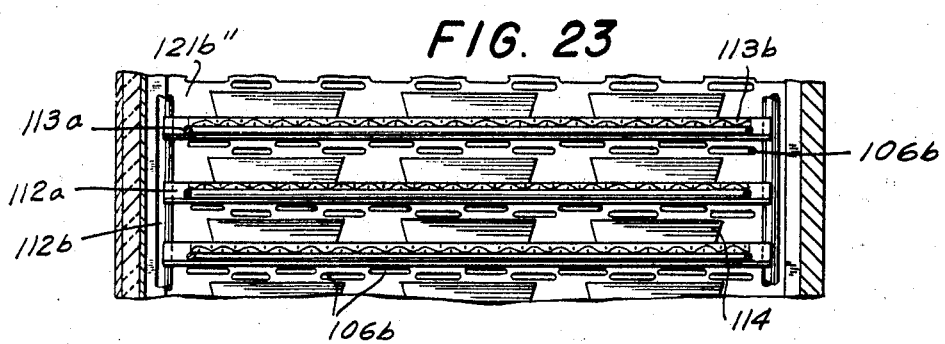

FIGS. 22 and 23 are vertical sectional views taken at lines 22—22 and 23—23, respectively, of FIG. 20.

Figure 1:
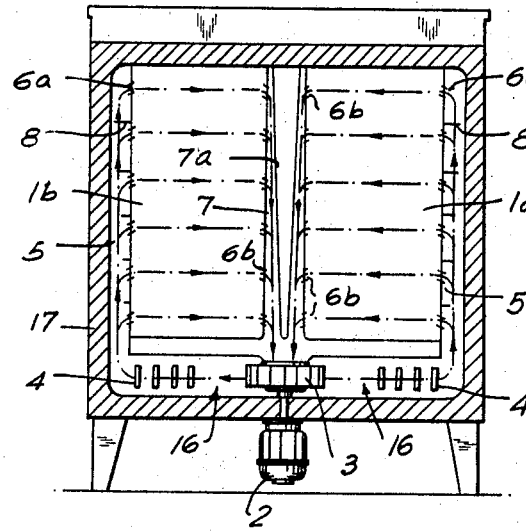
FIGS. 1 and 2 are views diagrammatically illustrating heating ovens embodying the invention.

Referring to FIG. 1, an oven embodying the invention is shown having a hollow interior defining two spaces 1a and 1b adapted to receive a plurality of receptacles 14 containing food to be heated. A motor 2 is arranged to drive a fan 3 for discharging air past heating elements 4. The heated air flows from the heating elements 4 into vertically extending passages 5 which may be referred to as air delivery channels. In the air delivery channels 5 are provided vertically spaced baffles 8 which extend horizontally outward from the outer side walls of the heating spaces 1a and 1b. The baffles 8 increase in size from the bottom to the top of each air delivery channel 5 to provide upward paths of flow for heater air in which successive portions of the channels at the baffles 8, in the direction of air flow, become increasingly smaller in cross-sectional area.

The outer side walls of the heating spaces 1a and 1b are provided with holes or slots 6a for dividing the heated air in the air delivery channels 5 into a plurality of streams which pass through the heating spaces 1a and 1b in substantially parallel paths of flow. The opposite inner side walls of the heating spaces 1a and 1b are provided with openings or slots 6b for discharging air exteriorly of the heating spaces.

The air discharged from the heating spaces 1a and 1b passes into vertically extending passages 7 which may be referred to as air discharge channels in which air emerging from the openings or slots 6b is collected. The air discharge channels 7, which are formed by a V-shaped member 7a disposed between the inner side walls of the oven spaces 1a and 1b, provide downward paths of flow for air having cross-sectional areas which are increasingly larger in the direction of air flow. The air collected in the air discharge channels 7 flows downward therein to the inlet of the fan 3 from which air is discharged past the heating elements 4.

Figure 2:
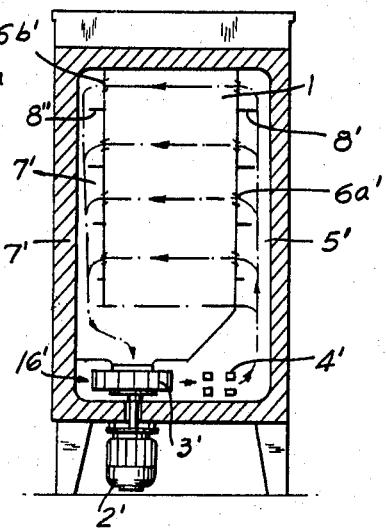

A heating oven embodying the invention is diagrammatically shown in FIG. 2 which is like the heating oven shown in FIG. 1 and just described and differs therefrom in that both the air delivery channel 5' and air discharge channel 7' are provided with vertically spaced baffles 8' and 8", respectively, at the opposing side walls of the heating space 1. The baffles 8' increase in size from the bottom to the top of the air delivery channel 5' to provide an upward path of flow for heated air in which successive portions of the channel at the baffles 8', in the direction of air flow, become increasingly smaller in cross-sectional area. The baffles 8" also increase in size from the bottom to the top of the air discharge channel 7' to provide a downward path of flow for air in which successive portions of the channel at the baffles 8", in the direction of air flow, become increasingly larger in cross-sectional area.

In the embodiment of FIG. 2, a motor 2' is arranged to drive a fan 3' for discharging air past the heating element 4', the heated air flowing upward in the air delivery channel 5'. The side wall of the heating space 1 at the air delivery channel 5' is provided with holes or slots 6a' for dividing heated air in the air delivery channel into a plurality of streams which pass through the heating space 1 in substantially parallel paths of flow. The opposite inner wall of the heating space 1 is provided with holes or slots 6b' for discharging air exteriorly of the heating space into the air discharge channel 7'. The air collected in the air discharge channel 7' flows downward therein to the inlet of the fan 3' from which it is discharged past the heating element 4'.

In both the embodiments of FIGS. 1 and 2 it will be seen that the heating spaces and air delivery channels and air discharge channels form circuits 16 and 16', respectively, for recirculating air with the aid of the fans 3 and 3'. Further, the ovens in FIGS. 1 and 2 are provided with exterior insulated walls 17 and 17', respectively, for thermally insulating the heating spaces, air delivery and air discharge channels, heating elements, and fans from the surroundings, so that heat loss from the ovens will be minimized.

The ovens shown in FIGS. 1 and 2 and just described are especially suitable for rapidly heating at one time food held in a large number of receptacles. In order to effect uniform heating of all receptacles, especially when the ovens have been preheated, it is highly desirable to insert the receptacles into the oven all at one time and also to remove them from the oven all at one time. This is particularly true when the receptacles to be inserted into the oven contain frozen food and are cold to handle, and the receptacles to be removed from the oven have been heated to a definite elevated temperature and are hot to handle.

This is accomplished by providing a cart 11 which is movable on wheels 11a with the aid of a handle 11b and provided with two pairs of spaced L-shaped members 11c extending transversely of the cart 11. Each pair of L-shaped members 11c serves as a support for a vertically extending frame 12 having a plurality of side rails 12a at opposing sides thereof which are vertically spaced one above another. The side rails 12a serve as supports for apertured shelves 13 upon which are positioned the receptacles 14 containing food to be heated.

Figure 4:
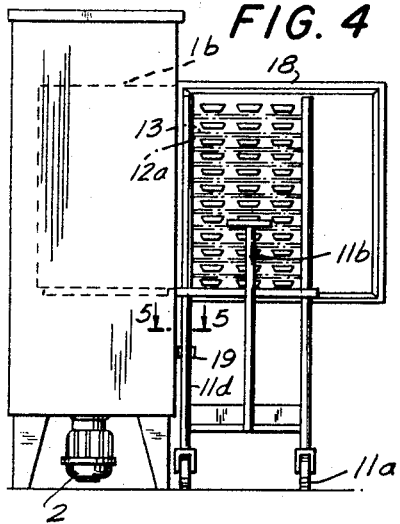
FIG. 4 is an end view of the heating oven shown in FIG. 1 and the food handling structure shown in FIG. 3 with the food handling structure adjacent to the heating oven.

After the receptacles 14 are positioned on the shelves 13 and the frames 12 are loaded, the door 18 of the oven shown in FIG. 1 may be opened and the cart 11 moved in front of the heating spaces 1a and 1b, as diagrammatically illustrated in FIG. 4. In order to align the L-shaped members 11c directly in front of the heating spaces 1a and 1b, respectively, the oven may be provided with suitable fastening members, such as C-shaped resilient clips 19, to receive and hold the legs 11d of the cart 11 adjacent to and immediately in front of the oven.

The L-shaped members 11c function as a track or guideway for the frames 12 and desirably are at the same level as the bottoms of the heating spaces 1a and 1b. When the cart 11 is detachably connected to the oven by the fastening members 19, the frames 12 can be pushed from the L-shaped members or tracks 11c into the heating spaces 1a and 1b, respectively. The cart 11 can immediately be moved from the front of the oven and the door 18 closed, and heating of all the receptacles 14 will commence at the same time.

Figure 6:
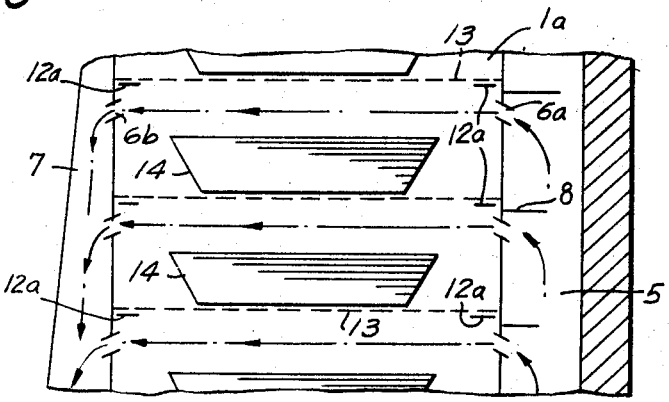
FIG. 6 is an enlarged fragmentary view diagrammatically illustrating the food handling structure of FIG. 3 in the heating oven shown in FIG. 1.

In the oven, the receptacles 14, which may be frozen food packages, for example, are stacked one above another in vertically spaced relation in the upright heating spaces, as diagrammatically illustrated in FIG. 6. In order to effect uniform heating of all of the receptacles 14 in the oven, it is essential that heated air introduced into the heating spaces 1a and 1b through the openings or slots 6a flow at substantially the same speed through all parts of each of the heating spaces. Preferably, the heated air should flow at a high rate of speed and the receptacles 14 be so positioned in the heating spaces 1a and 1b that the heated air forcibly sweeps horizontally past the receptacles in paths of flow which are closely adjacent to and in intimate physical contact with them. The streams of heated air pass in parallel paths of flow or strata through the heating spaces in such manner that a given volume of heated air of each stream will enter and be discharged from the heating space and flow only past those food receptacles 14 disposed in its particular horizontal path of flow.

Figure 3:
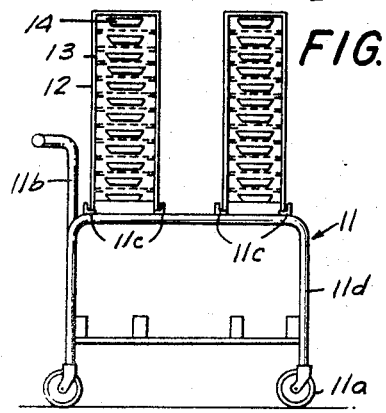
FIG. 3 is a view in elevation diagrammatically illustrating food handling structure for transferring food into and out of the heating ovens shown in FIGS. 1 and 2.

Therefore, when the loaded frames 12 in FIG. 3 are inserted at one time into the heating spaces 1a and 1b of the oven in FIG. 1, the heated air flowing into the air delivery channel 5 is divided into a plurality of air streams at the openings or slots 6a at the outer air inlet sides of the heating spaces. As explained above, the heated air forcibly flows at a sufficiently high velocity to the heating space for all of the air streams to flow contiguous to and in intimate physical contact with one another and horizontally one above another in strata from the outer air inlet sides adjacent to the air delivery channels 5 to the opposite air outlet sides adjacent to the air discharge channels 7, and the air streams discharge from the heating spaces through the slots or openings 6b at the opposite air outlet sides of the heating spaces.

The baffles 8 in FIG. 1 and the baffles 8' in FIG. 2 function to distribute the heated air at the air inlet sides of the heating spaces in such manner that each distributed part of the heated air is introduced into the heating spaces at the slots 6a and 6a' at an inlet pressure to cause all of the air streams to flow at the same speed across the heating spaces from the air inlet sides to the opposite air outlet sides thereof. Further, the air discharge channels 7 in FIG. 1, which increase in cross-sectional area in the direction of air flow, and the baffles 8" in FIG. 2 function to promote the discharge of the air streams at the air outlet side through the slots 6b and 6b' exteriorly of the heating spaces and the combining of the discharged air streams. Due to the manner in which the baffles 8 and 8' function in the air delivery channels 5 and 5' and the manner in which the air discharge channels 7 in FIG. 1 and the baffles 8" in air discharge channel 7' in FIG. 2 function, as just pointed out, the air streams collectively will form a single continuously moving mass of heated air in each of the heating spaces or heating zones which envelops all sides of the receptacles 14 in the stack with successive portions thereof passing only once from the air inlet side to the air outlet side for discharge from each heating space. In this way the food in the receptacles of the stack will be rapidly heated uniformly and the food in all of the receptacles will reach the definite elevated temperature at substantially the same time.

As pointed out above, it is desirable for the divided air streams to move through the heating spaces 1a and 1b at the same rate in parallel paths of flow with each successive portion or given volume of heated air of each stream sweeping past only the food receptacle or receptacles in its particular horizontal path of flow. Accordingly, the heated air flows to the heating spaces at a sufficiently high velocity and the heated air is distributed at the air inlet sides of the heating spaces in such manner that each distributed part of the heated air will be introduced in the slots 6a and 6a' at an inlet pressure to cause all of the divided air streams to flow across the heating spaces at the same speed and practically all of the air of the several air streams will be discharged from the air outlet sides after successive portions thereof have passed across the heating spaces only once, so that recirculation of heated air within the heating spaces 1a and 1b is kept at a minimum and the variation in temperature in different parts of the heating spaces likewise is kept at a minimum.

In order that the heated air can forcibly sweep past the receptacles 14 in paths of flow which are closely adjacent to an intimate physical contact with them, as described above, the receptacles desirably are stacked in the frames 12 so that the divided air streams introduced through the slots 6a are directed primarily over the top of one receptacle 14 in the stack and below the next higher receptacle in the stack, as diagrammatically illustrated in FIG. 6. As diagrammatically shown in FIGS. 3 and 6, the height of the receptacles 14 is at least half of the vertical distance between adjacent apertured shelves 13. Thus, the gaps or passages between the receptacles 14 in the stack are relatively narrow and will promote the sweeping effect of the divided heated air streams forcibly flowing past the receptacles and heat transfer to the food in the receptacles 14 by air convection.

Figure 5:
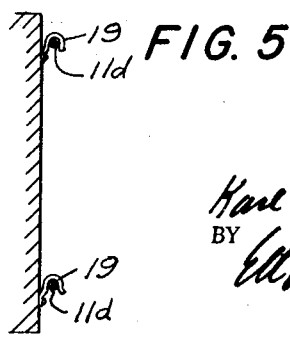
FIG. 5 is a fragmentary sectional view taken at line 5—5 of FIG. 4.

After the food in the receptacles 14 has been heated a sufficient length of time in the heating zones within the oven interior and the food in all of them is heated to the definite elevated temperature, the door 18 can be opened and the cart 11 detachably connected to the front of the oven, as shown in FIGS. 4 and 5 and described above, and the frames 12 can be moved forward from the heating spaces 1a and 1b onto the tracks or guideways formed by the L-shaped rails 11c. With this arrangement all of the receptacles 14 in each frame 12 can be removed from a heating space at one time and the length of time all of the receptacles are heated can be nicely controlled.

When the frames 12 are employed to insert stacks of receptacles 14 into the heating spaces 1a and 1b as a unit, it is desirable to preheat the heating spaces. Since heating of the food in the receptacles 14 desirably is effected at a predetermined temperature which is higher than the final or definite elevated temperature to which the food is to be heated, the heating spaces 1a and 1b should be preheated to a temperature at least as high as the predetermined high temperature. Accordingly, after the heating spaces 1a and 1b have been heated to a temperature at least as high as the predetermined high temperature, the stacks of the receptacles 14 are inserted into the heating spaces at the same time by the frames 12 which form a part of the oven structure to heat the receptacles or food packages in vertically extending heating zones. Likewise, when the food in the receptacles 14 has been heated to the definite elevated temperature, the stacks of receptacles 14 can be removed from the heating spaces at the same time with the aid of the cart 11.

In view of the foregoing, it will now be understood that in FIGS. 1 and 2 circuits for circulation of air are provided which include the heating spaces and an air flow line or conduit structure respectively communicating with the air inlet and air outlet sides of the heating spaces. For example, the circuit for circulating of air in the right-hand part of the oven in FIG. 1 includes the heating space 1a and conduit structure extending about the opposing sides and bottom of the heating space. The right-hand end of the conduit structure is in communication with the air inlet side of the heating space, and the left-hand end of the conduit structure is in communication with the air outlet side of the heating space.

The fan 3 in the bottom part of the conduit structure functions to forcibly circulate air at a sufficiently high velocity for the heated air flowing to the right-hand air inlet side to be divided at the slots 6a therein to produce a plurality of air streams which flow contiguous to and in intimate physical contact with one another and horizontally one above another from the air inlet side to the air outlet side of the heating space 1a and discharge through the slots 6b in the air outlet side exteriorly of the heating space. The conduit structure includes the air delivery channel 5 at the air inlet side which embodies first means that functions to distribute the heated air and introduce each distributed part of the heated air into the slots 6a at an inlet pressure to cause all of the air streams to flow at the same speed across the heating space from the air inlet side to the opposite air outlet side.

Further, the conduit structure includes the air discharge channel 7 at the air outlet side which embodies second means that functions to promote discharge of the air streams through the slots 6b exteriorly of the heating space and the combining of the discharged air streams. Due to the manner in which the first means and second means function, as described above, like portions of food in the receptacles 14 of the same size in a stack will be rapidly heated uniformly and the food in all of the receptacles will reach a definite elevated temperature at the same time.

In FIGS. 7 and 8 are diagrammatically shown heating ovens 120 and 120′ illustrating modifications of the invention. The heating ovens 120 and 120′ are provided with hollow interiors having insulated walls 117 and 117′ within which are disposed casings 121a, 121b and 121 defining heating spaces 101a, 101b and 101, respectively, adapted to receive receptacles 114 containing food to be heated.

In FIG. 8 a motor 102′ is arranged to drive a fan 103′ for discharging air past heating element 104′ into a vertically extending passage 105′ which may be referred to as an air delivery channel. The passage 105′ is defined by the right-hand side wall of the casing 121 which is vertical and erect and a wall 122a′ spaced therefrom which is inclined from the vertical and slopes inward toward the right-hand side wall of the casing 121.

The right-hand side wall of the casing 121 is provided with slots 106a′ for dividing the heated air in the air delivery channel 105′ into a plurality of streams which pass through the heating space 101 in substantially parallel paths of flow. The opposite side wall of the casing 121 is provided with slots 106b′ for discharging air exteriorly of the heating space 101. The air discharged from the heating space 101 passes into vertically extending passage or air discharge channel 107′ in which air emerging from the slots 106b′ is collected. The air discharge channel 107′ is defined by the left-hand side wall of the casing 121 which is vertical and erect and a wall 122b′ spaced therefrom which is inclined from the vertical and slopes inward toward the left-hand side wall of the casing 121. The air collected in the air discharge channel 107′ flows downward therein to the inlet of the fan 103′ from which air is discharged past the heating element 104′.

In FIG. 7 a motor 102 is arranged to drive a fan 103 for discharging air past heating elements 104. The heated air flows from the heating elements 104 into vertically extending air delivery channels 105. The outer walls of the heating spaces 101a and 101b are provided with slots 106a for dividing the heated air in the air delivery channels 105 into a plurality of streams which pass through the heating spaces 101a and 101b in substantially parallel paths of flow. The opposite inner side walls of the heating spaces are provided with slots 106b for discharging air exteriorly of the heating spaces.

The air discharged from the heating spaces 101a and 101b passes into vertically extending air discharge channels 107 in which air emerging from the slots 106b is collected. The air discharge channels 107, which are formed by a V-shaped member 107a disposed between the inner side walls of the casings 121a and 121b, provide downward paths of flow for air. The air collected in the air discharge channels 107 flows downward therein to the inlet of the fan 103 from which air is discharged past the heating elements.

In FIG. 7 the air delivery channels 105 are formed by the outer side walls of the casings 121a and 121b, which are vertical and erect, and walls 122a and 122b spaced therefrom which are inclined from the vertical and slope inward toward the right-hand side wall of the casing 121a and left-hand side wall of the casing 121b, respectively.

The heating ovens 120 and 120′ illustrated in FIGS. 7 and 8 and just described are like the ovens in FIGS. 1 and 2 and especially suitable for rapidly heating at one time food held in a large number of receptacles. In order to insert a large number of the receptacles into the ovens all at one time and also to remove them from the ovens all at one time, food handling structure like that shown in FIGS. 14, 15 and 16 may be employed. The food handling structure comprises a cart 111 which is movable on wheels 111a with the aid of a handle 111b and provided with two pairs of L-shaped members 111c extending transversely of the cart. As seen in FIGS. 15 and 19, the L-shaped members 111c may be provided with rollers 111e mounted for rotation thereon.

Each pair of L-shaped members 111c serves as a support for a vertically extending frame 112 shown in FIGS. 14, 17 and 19 and like the frames shown in FIG. 3. Each frame 112 comprises spaced U-shaped side members 112b which are connected by end cross members 112c and the bottoms of which serve as skids. Each side member 112b is provided with L-shaped rails 112a which are vertically spaced one above another and serve to support apertured shelves 113. Each shelf 113 comprises a frame 113a of rectangular form and wire mesh or screening 13b secured thereto, as best shown in FIGS. 18, 19 and 21.

After the receptacles 114 are positioned on the shelves 113 and the frames 112 are loaded to provide three vertical stacks of the receptacles on each frame, the door structure 118 of the oven 120 may be opened and the cart 111 moved in front of the heating spaces 101a and 101b, as shown in FIG. 19. The L-shaped members 111c desirably are aligned with spaced tracks or rails 123a in the bottom end walls of the heating spaces 101a and 101b, the rails 123a being best shown in FIG. 21. Stated another way, the tracks or rails 123a form guideways at surfaces at the vicinities of the bottom walls of the vertically extending heating spaces or zones 101a and 101b. To locate the cart 111 in its proper food handling position in front of the oven 120, the latter may be provided with suitable fastening members, such as C-shaped clips 119, to receive and hold the legs 111d adjacent to and immediately in front of the oven, as best shown in FIGS. 15 and 19.

Rollers 123b may be mounted on the rails 123a for rotation thereon to facilitate transfer of the frames 112 from the cart 111 into the heating spaces 101a and 101b and from the latter back to the cart 111. As shown in FIG. 19, the oven 120 may be provided with legs 124 which are vertically adjustable at 124a to adjust the oven vertically with respect to the cart 111, so that the rails 111c on the cart and the rails 123a in the bottom walls of the heating spaces will be at the same height. After the frames 112 are pushed into the heating spaces 101a and 101b to form a part of the oven structure to heat food packages in vertically extending heating zones, the cart 111 can be moved from the front of the oven 120 and the door structure 118 closed, and heating of all the receptacles 114 will commence at the same time in the heating zones within the oven interior.

Figure 10:
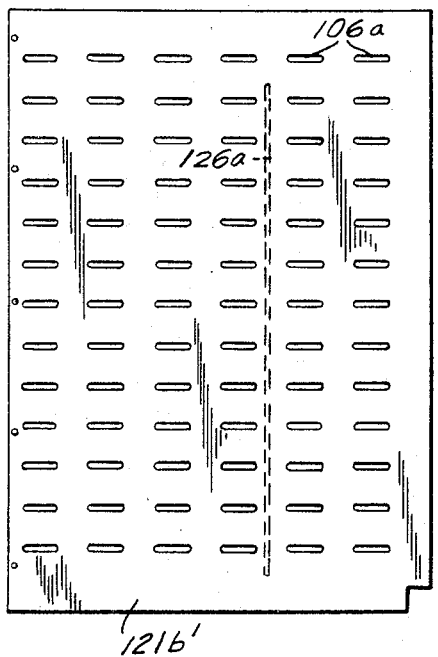
FIGS. 10 and 11 are views in elevation of the side walls of the heating spaces of the ovens shown in FIGS. 7, 8 and 9.
Figure 11:
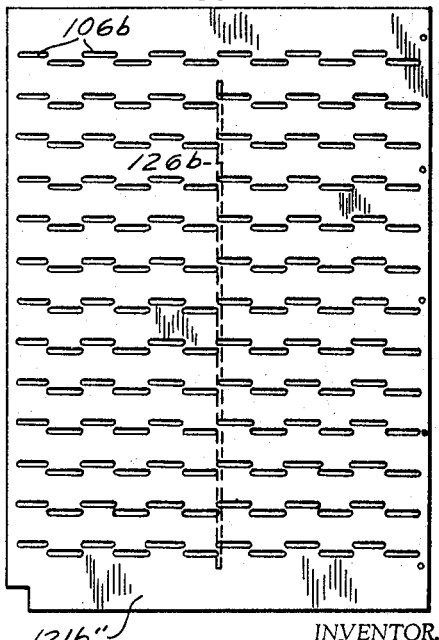

As shown in FIGS. 10 and 22, the slots 106a at the outer air inlet sides 121a' and 121b' of the heating spaces 101a and 101b, respectively, are formed in horizontal rows which are vertically spaced from one another. As shown in FIGS. 11 and 23, the slots 106b at the inner air outlet sides 121a" and 121b" of the heating spaces 101a and 101b, respectively, also are formed in horizontal rows which are vertically spaced from one another. The slots 106a in each row of slots at the air inlet sides 121a' and 121b' of the heating spaces are in horizontal alignment in single file. The slots 106b in each row of slots at the air outlet sides 121a" and 121b" of the heating spaces are divided into two vertically spaced groups which are closely adjacent to one another and in staggered relation, alternate slots in each row forming one group and the remaining slots in the row forming the other group, whereby the slots 106b in each row extend in a zig-zag path from the front to the rear of the heating spaces 101a and 101b at the air outlet sides thereof.

The receptacles 114 are stacked in the frames 112 so that the divided air streams introduced through the slots 106a are directed primarily over the tops of the receptacles 114 on one of the shelves 113 in the stacks and below the receptacles on the next higher shelf 113 in the stacks, as illustrated in FIGS. 20, 22 and 23. The height of the receptacles 114 is at least half of the vertical distance between adjacent apertured shelves 113, whereby the gaps between the receptacles 114 in the several stacks are relatively narrow and will promote the sweeping effect of the divided heated air streams flowing past the receptacles and heat transfer to the food in the receptacles 114 by air convection. Hence, the receptacles 114 are supported on the shelves 113 in such manner that the receptacles offer minimum resistance to flow of heated air in the heating spaces. As best shown in FIG. 23, the slots 106b at the air outlet sides of the heating spaces 101a and 101b also are vertically disposed with respect to the shelves 113 and receptacles 114 to promote discharge of the air streams flowing over the tops and bottoms, respectively, of the receptacles in the several stacks.

When heating of food in the receptacles 114 is being effected objectionable fumes often are produced which are taken up by the circulating heating air. Also, when the receptacles 114 contain frozen food which must be both thawed and heated before it is served, the heating air becomes laden with moisture in the form of water vapor. In order to remove fumes and moisture from the heating air, the ovens 120 and 120' in FIGS. 7 and 8 are provided with vents, as indicated at 125 and 125', respectively. By providing the vents the circuits for circulation of heating air in the ovens 120 and 120' operate substantially at atmospheric pressure and suitable conduits (not shown) may be connected to the vents 125 and 125' in which the vented water vapor condenses and through which the condensed moisture is conducted to waste along with the fumes vented from the ovens.

After the food in the receptacles 114 has been heated a sufficient length of time and the food in all of them is heated at the same time to the definite elevated temperature, the door structure 118 can be opened and the cart 111 detachably connected to the front of the oven with the aid of the C-shaped clips 119. The frames 112 can be moved forward from the heating spaces 101a and 101b and onto the tracks or rails 111c of the cart 111 and the cart can then be detached from the heating oven 120.

In the heating ovens 120 and 120' being described, the fans 103 and 103' function to deliver heated air at a sufficiently high velocity for the air to be divided at the air inlet slots 106a and 106a' into a plurality of streams which flow contiguous to and in intimate physical contact with one another and horizontally one above another from the air inlet sides to the air outlet sides of the heating spaces and discharge through the slots 106b and 106b' exteriorly of the heating spaces.

The air delivery channels 105 and 105' function to distribute the heated air at the air inlet sides of the heating spaces in such manner that each distributed part of the heated air is introduced into the heating spaces at the slots 106a and 106a' at an inlet pressure to cause all of the streams to flow at the same speed across the heating spaces from the air inlet sides to the air outlet sides thereof.

As previously explained, the air delivery channels 105 in FIG. 7 are defined by the outer side walls 121a' and 121b' of the heating spaces 101a and 101b, which are vertical and erect, and the walls 122a and 122b spaced therefrom which slope inward from the ends of the oven 120. As best shown in FIGS. 9 and 21, the air delivery channels 105 are rectangular in horizontal cross-section and successive portions thereof in the upward direction of air flow have increasingly smaller cross-sectional areas.

In order to promote uniform distribution of heated air in the air delivery channels 105 of the oven 120, the opposing sides 121a', 122a and 121b', 122b of the channels do not meet or come together at their upper ends to form sharp apices, but instead are spaced from one another throughout their entire vertical height. Hence, the outer sloping walls 122a and 122b of the channels 105 are spaced from the vicinities of all of the slots 106a in the inner walls 121a' and 121b' thereof. Also, the opposing side walls of the channels 105 are spaced apart at their extreme upper closed ends, as indicated at 105a in FIG. 9, the regions at which the upward paths of flow of heated air terminate. Further, a part of each air delivery passage 105 extends upward from the highest row of air inlet slots 106a to the extreme upper closed ends 105a of the channels. With this construction, it has been discovered that the air streams at the extreme upper parts of the heating spaces 101a and 101b will flow from the air inlet sides to the air outlet sides of the heating spaces at more nearly the same speed as the air streams at the bottom parts thereof.

A modification of the air delivery channels 105 of FIG. 9 is shown in FIGS. 9A and 9B. In FIGS. 9A and 9B the air delivery channels 205 are also defined by the air inlet sides 221a' and 221b' of the heating spaces and the inwardly sloping walls 222a and 222b spaced therefrom. The sloping outer walls 222a and 222b are spaced from the vicinities of all of the air inlet slots 206a in the air inlet sides 221a' and 221b' of the heating spaces. The top end walls 205a of the air delivery channels 205 are not horizontal as are the end walls 105a in FIG. 9, but are inclined and form apices with the inner walls 221a' and 221b' of the channels. Even with this construction parts of the upward paths of flow for the heated air in the air delivery channels 205 extend upward beyond the top row of air inlet slots 206a to provide dead-end spaces which promote the desired distribution of heated air at the air inlet sides of the heating spaces.

The function of the air delivery channels 105 in FIG. 9 and 205 in FIGS. 9A and 9B is to effect such distribution of the heated air therein that the air will be divided into horizontal streams at the spaced vertical rows of slots 106a and the streams will flow at the same speed across the heating spaces. In order that the speed of the air streams will be the same, the heated air desirably should be introduced into the air inlet slots 106a, which are of the same size, at substantially the same inlet pressure. It has been discovered that when the total area of the air inlet slots 106a is within a range from about 45 percent to 70 percent of the maximum cross-sectional area of the air delivery channel, the desired distribution of air in the air delivery channel is promoted and each distributed part of the heated air will be introduced into a different one of the slots 106a at substantially the same inlet pressure.

By way of example and without limitation, a heating oven has been constructed like that shown in FIGS. 7, 9, 10, 20 and 21 in which the outer side walls 121a' and 121b' of the casings 121a and 121b are about 600 mm. deep and about 800 mm. high, each outer side wall having six slots in a row and thirteen vertically spaced rows of slots. Each slot 106a is about 7 mm. high and 50 mm. long, and since there are seventy-eight slots distributed in the air inlet sides of the heating spaces, the total cross-sectional area of the air inlet slots at each air inlet side is about 26,900 sq. mm.

The maximum cross-sectional area of each air delivery channel 105 is at its lower inlet end, as indicated by the dotted lines 105b in FIG. 9. Since the air delivery channels 105 also are about 600 mm. deep and about 95 mm. wide at their lower air inlet ends 105b, the maximum cross-sectional area of each air inlet channel is about 57,000 sq. mm. In the heating oven being described, therefore, the total cross-sectional area of the air inlet openings 106a at the air inlet side of each heating space is about 47 percent of the maximum cross-sectional area of an air delivery channel 105 at its air inlet end at 105b.

Further, the width of each air delivery channel 105 at its closed end at 105a is about 30 percent of the width at its inlet end at 105b and the path of flow of air extends upward past the top row of slots 106a for a vertical height which is at least the same or exceeds the width of the air delivery channel at the vicinity of the top row of slots 106a. Air delivery channels 105 like those just described function in a satisfactory manner to effect the desired distribution of heated air with the distributed parts being introduced into the air inlet slots 106a at substantially the same inlet pressure to cause all of the air streams to flow across the heating spaces at the same speed.

To promote the uniform speed of the air streams in the heating spaces 101a and 101b, the air discharge channels 107 are like the air delivery channels 105. In the heating oven being described the widths of the air discharge channels 107 at their closed ends 107a and at their widest portions 107b are essentially the same as the widths of the air delivery channels 105 at 105a and 105b, respectively. Further, the total cross-sectional area of the air outlet slots 106b for each heating space desirably is from 25 percent to 100 percent greater than the total cross-sectional area of the air inlet slots therefor. In the heating oven being described and like that shown in FIGS. 7, 9, 10 and 11, for example, each of the inner side walls 121a" and 121b" of the casings 121a and 121b has twelve slots 106b in zig-zag formation in each row and thirteen vertically spaced rows of slots. Since each slot 106b also is about 7 mm. high and 50 mm. long in the oven being described, the total cross-sectional area of the air outlet slots at each air outlet side is about 53,800 sq. mm. and about 100 percent greater than the total cross-sectional area of the air inlet openings 106a and approaches the maximum cross-sectional area of about 57,000 sq. mm. of the air discharge channels 107 at their lower outlet ends 107b.

In the heating oven which has been constructed and like that described, it is possible to heat seventy-two frozen food packages at one time arranged in six stacks of twelve packages each, each frame 112 holding three stacks of the packages. Before the frozen food packages, which are at a temperature of about −20° to −25° C., are inserted into the oven, which is provided with a suitable thermostatic control (not shown), the oven under thermostatic control desirably is preheated to a temperature of about 230° C. When the oven is empty and preheated to such a high temperature, the maximum temperature differential in each heating space 101a and 101b may be about 2.8° C.

When the oven has attained the temperature of about 230° C., the oven thermostat may then be adjusted to maintain the heating spaces at a predetermined temperature of about 180° C. and all of the frozen food packages inserted into the heating oven at one time. Separate timer mechanisms may be employed to control the length of time heating is effected by the heating elements 104 and the length of time the fan 103 operates, and it may be desirable to allow the fan 103 to operate for a short time, such as five minutes, for example, after the heating elements cease to operate, to promote uniform heating of the food packages. In an overall cooking time of about twenty to thirty minutes the frozen food packages will all be heated to the same temperature, which is the definite elevated temperature at which the food is to be served.

When the heating oven 120 is being heated to an elevated temperature ranging from 180° C. to 230° C., for example, there is a tendency for the slotted air inlet and outlet sides of the heating spaces 101a and 101b to warp. Warping of the slotted air inlet sides of the heating spaces causes them to assume a wave-like form which tends to produce variations in the inlet pressure of the heated air at the air inlet slots 106a. In order to reinforce the air inlet and air outlet sides of the heating spaces 101a and 101b and prevent warping thereof, L-shaped angle members 126a and 126b, which extend vertically between the top and bottom parts of the side walls of the casings 121a and 12b, are fixed to the outer faces thereof, as by welding or brazing, for example.

Modifications of the embodiments of the invention which have been described and illustrated will occur to those skilled in the art, so that it is desired not to be limited to the particular arrangements set forth. Moreover, certain features of the invention can be advantageously employed independently of other features. Therefore, it is intended in the claims to cover all those modifications and features which do not depart from the spirit and scope of the invention. However, subject matter shown in FIGS. 7 to 13 and in FIGS. 19 to 23 and described herein which is common to this application and to copending application Ser. No. 346,502, filed Feb. 21, 1964, and not being claimed herein is claimed in application Ser. No. 346,502, now Patent No. 3,261,343, granted July 19, 1966. Also, food handling structure like that shown in FIGS. 3, 4, 5, and 14 to 19 and described herein for use in combination with heating ovens like those shown in FIGS. 1, 2 and 6 and in FIGS. 7 to 13 and 20 to 23, respectively, is claimed in copending application Ser. No. 346,560, filed Feb. 21, 1964, now Patent No. 3,261,650, granted July 19, 1966.

What is claimed is:

1. Apparatus of the class described for heating to a definite elevated temperature at the same time like portions of food held in receptacles of the same size having, in combination,
   (a) a casing having opposing side walls and top and bottom end walls defining an upright heating space,
   (b) structure for stacking a plurality of the receptacles one above another in vertically spaced relation in a single body of air in the heating space, said stacking structure comprising vertically spaced apertured shelves disposed one above another for supporting the receptacles in the stack,
   (c) the opposing side walls having vertically spaced slots and respectively defining an air inlet side and an air outlet side of the heating space,
   (d) a circuit for circulation of air including the heating space and conduit structure having one end communicating with the air inlet side of the heating space and the opposite end communicating with the air outlet side thereof,
   (e) means in the conduit structure for heating air flowing to the air inlet side of the heating space,
   (f) means in the conduit structure for forcibly circulating the air at a sufficiently high velocity for the heated air flowing to the air inlet side to be divided at the slots therein to produce a plurality of air streams which flow contiguous to and in physical contact with one another and horizontally one above another in strata from the air inlet side to the air outlet side of the heating space and discharge through the slots in the air outlet side exteriorly of the heating space, (g) the conduit structure embodying means including the air inlet side of the heating space for distributing the heated air and introducing each distributed part of the heated air into the slots at the air inlet side at an inlet pressure to cause all of the air streams to flow at the same speed across the heating space from the air inlet side to the opposite air outlet side, all of the air streams collectively functioning to form a single continuously moving mass of air in the heating space which defines the single body of air therein and envelops all sides of the receptacles in the stack with successive portions thereof passing only once from the air inlet side to the air outlet side with each stream of heated air flowing only past those receptacles in its particular stratum to rapidly heat uniformly all of the food held in the receptacles in the stack and heat all of the like portions of the food to the definite elevated temperature at the same time, (h) the air distributing means embodied in the conduit structure defining a vertically extending passageway at the air inlet side of the heating space in which successive zones thereof in the direction of air flow have increasingly smaller cross-sectional areas, and (i) the air distributing means embodied in the conduit structure including baffles which are spaced lengthwise of the vertically extending passageway and transverse thereto, successive zones of the passageway, at the regions of the baffles, having increasingly smaller cross-sectional areas in the direction of air flow.

2. Apparatus of the class described for heating to a definite elevated temperature at the same time like portions of food held in receptacles of the same size having, in combination, (a) a casing having opposing side walls and top and bottom end walls defining an uprgiht heating space, (b) structure for stacking a plurality of the receptacles one above another in vertically spaced relation in a single body of air in the heating space, said stacking structure comprising vertically spaced apertured shelves disposed one above another for supporting the receptacles in the stack, (c) the opposing side walls having vertically spaced slots and respectively defining an air inlet side and an air outlet side of the heating space, (d) a circuit for circulation of air including the heating space and conduit structure having one end communicating with the air inlet side of the heating space and the opposite end communicatiing with the air outlet side thereof, (e) means in the conduit structure for heating air flowing to the air inlet side of the heating space, (f) means in the conduit structure for forcibly circulating the air at a sufficiently high velocity for the heated air flowing to the air inlet side to be divided at the slots therein to produce a plurality of air streams which flow contiguous to and in physical contact with one another and horizontally one above another in strata from the air inlet side to the air outlet side of the heating space and discharge through the slots in the air outlet side exteriorly of the heating space, (g) the conduit structure embodying means including the air inlet side of the heating space for distributing the heated air and introducing each distributed part of the heated air into the slots at the air inlet side at an inlet pressure to cause all of the air streams to flow at the same speed across the heating space from the air inlet side to the opposite air outlet side, all of the air streams collectively functioning to form a single continuously moving mass of air in the heating space which defines the single body of air therein and envelops all sides of the receptacles in the stack with successive portions thereof passing only once from the air inlet side to the air outlet side with each stream of heated air flowing only past those receptacles in its particular stratum to rapidly heat uniformly all of the food held in the receptacles in the stack and heat all of the like portions of the food to the definite elevated temperature at the same time, (h) the slots in the opposing side walls of the casing being formed in horizontally extending rows vertically spaced from one another, each row of slots in one of the side walls defining the air inlet side of the heating space being substantially opposite one of the rows of slots in the other of the side walls defining the air outlet side of the heating space, and the total cross-sectional area of the slots at the air outlet side of the heating space being from twenty-five to one hundred percent greater than the total cross-sectional area of the slots at the air inlet side of the heating space.

3. Apparatus of the class described for heating to a definite elevated temperature at the same time like portions of food held in receptacles of the same size having, in combination, (a) structure defining a vertically extending heating zone, (b) said structure including spaced vertically extending members defining opposing sides of the heating zone and means for stacking a plurality of the receptacles one above another in vertically spaced relation in a single body of air in the heating zone between the sides thereof, the stacking means comprising vertically spaced apertured shelves disposed one above another for supporting the receptacles in the stack, (c) the opposing sides of the heating zone having vertically spaced openings and respectively defining an air inlet side and an air outlet side of the heating zone, (d) a circuit for circulation of air including the heating zone and an air flow line having one end thereof communicating with the air inlet side of the heating zone and the opposite end thereof communicating with the air outlet side thereof, (e) means in the air flow line for heating air flowing to the air inlet side of the heating zone, (f) means in the air flow line for forcibly circulating the air at a sufficiently high velocity for the heated air flowing to the air inlet side to be divided at the openings therein to produce a plurality of air streams which flow contiguous to and in physical contact with one another and horizontally one above another in strata from the air inlet side toward the air outlet side of the heating zone and discharge from the zone through the openings in the air outlet side thereof, (g) the air flow line embodying (1) first means including the air inlet side of the heating zone to promote distribution of the heated air and the introduction of the distributed heated air into the openings at the air inlet side and (2) second means including the air outlet side of the heating zone to promote discharge of the air streams from the zone through the openings at the air outlet side thereof and the combining of the discharged air streams, all of the air streams collectively functioning to form a single continuously moving mass of air in the heating zone which defines the singles body of air therein and envelops all sides of the receptacles in the stack with successive portions thereof passing only once from the air inlet side to the air outlet side with each stream of heated air flowing only past those receptacles in its particular stratum to rapidly heat uniformly all of the food held in the receptacles in the stack and heat all of the like portions of the food to the definite elevated temperature at the same time, and (h) the openings in the opposing sides of the heating zone being formed in horizontally extending rows vertically spaced from one another, each row of openings in one of the sides defining the air inlet side of the heating zone being substantially opposite one of the rows of openings in the other of the sides defining the air outlet side of the heating zone, and the total cross-sectional area of the openings at the air outlet side of the heating zone being from twenty-five to one hundred percent greater than the total cross-sectional area of the openings at the air inlet side of the heating zone.

References Cited

UNITED STATES PATENTS

| | | | |
|---|---|---|---|
| 2,490,076 | 12/1949 | Maxson | 219—35 |
| 3,021,795 | 2/1962 | Hayba et al. | 104—48 |

FOREIGN PATENTS

| | | |
|---|---|---|
| 1,198,612 | 6/1956 | France. |
| 1,268,923 | 6/1961 | France. |
| 812,417 | 4/1959 | Great Britain. |

FREDERICK L. MATTESON, JR., *Primary Examiner.*

E. G. FAVORS, *Assistant Examiner.*